3,640,951
STABILIZED POLYCARBONATES
Herbert L. Rawlings, New Martinsville, W. Va., assignor to Baychem Corporation, New York, N.Y.
No Drawing. Filed Aug. 30, 1968, Ser. No. 756,415
Int. Cl. C08g 51/60
U.S. Cl. 260—45.8     7 Claims

ABSTRACT OF THE DISCLOSURE

Polycarbonates stabilized against thermal degradation with a stabilizing amount of 2-(stilbyl-4″)-(4,5-arylo)-1,2,3,-triazole.

---

This invention relates to stabilized thermoplasic polymeric materials and, more particularly, to polycarbonates which are flame-resistant and stabilized against thermal degradation.

Polycarbonate materials are generally prepared by reacting di(hydroxyaryl)alkanes, di(hydroxyaryl)sulphones, di(hydroxyaryl)sulphoxides, di(hydroxyaryl) sulphides, di(hydroxyaryl)ethers or other aromatic dihydroxy compounds or mixtures thereof with phosgene haloformates or diesters of carbonic acid. In general, polycarbonates produced from these and other conventional materials according to conventional processes usually have a yellow or amber color at the time they are produced or else they acquire such a color upon standing. Further, the polycarbonate plastic often becomes discolored due to the thermal degradation of the polymer when it is heated during casting or other shaping processes in the presence of air, thus making it undesirable for the preparation of shaped articles in which it is important that the material from which the article is prepared is colorless.

Although polycarbonate plastics have been classified as self-extinguishing materials by ASTM standards, and although such polymers have a reltaively high temperature resistance, polycarbonate plastics are still unsuitable for many applications because they are not sufficiently flame-resistant or stable to thermal degradation. In order to cure this deficiency it has been proposed to use some type of high temperature material such as fiber glass with the polycarbonate to increase its temperature resistance. Although such expedients have been known to increase the heat resistance of polycarbonates by about 10° F., such a result is not sufficient to render polycarbonates sufficiently stable to the degradative effects of heat for commercial purposes. It has also been proposed to coat polycarbonate parts with a heat-resistant material such as a phenolic, an epoxy or even with metal coatings of various types. However, such expedients leave much to be desired when the application requires that the integral polymer itself be heat stable.

It is therefore an object of this invention to provide a thermoplastic polycarbonate which is devoid of the foregoing disadvantages.

Another object of this invention is to provide a method for stabilizing polycarbonates against thermal degradation.

A further object of this invention is to provide a polycarbonate plastic stabilized against thermal degradation and the resulting discoloration attendant thereon.

A still further object of the invention is to provide a method for preventing the discoloration of polycarbonates due to thermal degradation.

The foregoing objects and others are accomplished in accordance with this invention, generally speaking, by providing self-extinguishing, class one type polycarbonates stabilized against thermal degradation by having incorporated therein a stabilizing amount of a 2-(stilby-4″)-4,5-arylo-1,2,3-triazole.

The triazole stabilizers of this invention have the formula

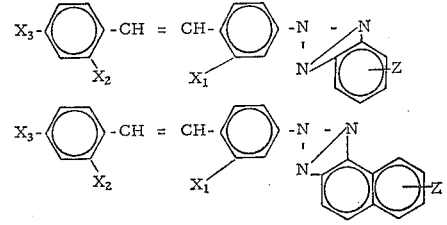

wherein Z is hydrogen or —SO₃H and X₁, X₂ and X₃ are the same or different hydrogen atoms, or sulfonyl or sulfonic acid radicals such as —SO₃H, —SO₂N(R)₂, —SO₂Alk —SO₂Ar and —SO₂OAr with the proviso that at least one of the X₁, X₂ and X₃ substituents is a sulfonyl or sulfonic acid grouping. In the foregoing radicals each R may be the same or different hydrogen atom, alkyl radical, cycloalkyl, aryl, aryloxy, alkoxy, and the like radicals wherein the alkyl groups, wherever they occur, preferably have from 1 to 10 carbon atoms such as methyl, ethyl, propyl, butyl, octyl, pentyl, heptyl, nonyl, decyl and the like; the cycloalkyl groups preferably have from 3 to 6 carbon atoms such as cyclopropyl, cyclobutyl, cyclohexyl, cyclopentyl and the like and the aryl groups, wherever they occur, are preferably phenyl and naphthyl. Alk is any suitable alkyl radical but preferably an alkyl radical having from 1 to 10 carbon atoms such as methyl, ethyl, propyl, butyl, octyl, hexyl, nonyl, decyl and the like and Ar is any suitable aryl radical but preferably phenyl or naphthyl. These triazoles may also contain any other substituents which are inert with respect to polycarbonates such as, for example, halogen including fluorine, chlorine, bromine, iodine and the like; alkoxy as defined for R; aryloxy as defined for R; alkyl as defined for Alk; aryl as defined for Ar; NO₂; phosphite, phosphate and the like.

The most preferred stabilizer in the practice of this invention has the formula

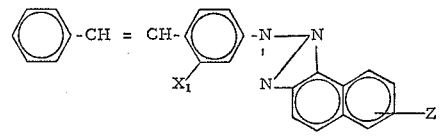

wherein Z is hydrogen or —SO₃H and X₁ is —SO₃H, —SO₂N(R)₂, —SO₂Alk, —SO₂Ar or —SO₂OAr wherein R, alk and Ar are as defined above. It is to be understood that the triazoles exist in several possible canonic forms and that the representation thereof in the foregoing formulae is merely a diagrammatic way of representing the many possible mesomers in which they exist.

The polycarbonates stabilized in accordance with this invention are resistant to thermal degradation, even at temperatures of about 600° F. which are used during processing by extrusion and injection molding, and they do not become discolored and turn yellow due to a decline in the molecular weight of the polymer induced by continued exposure to heat. Further, these results are obtained without any attendant loss of toughness on aging at 100° C. and without loss of melt color stability. Further, the color stability obtained is not due to the reinforcement of re-emitted light due to the fluorescent nature of the thermal stabilizers of this invention; however, when this factor is present, as when aged samples are visually evaluated, the effect of the triazoles of this invention as thermal stabilizers is even more pronounced in preserving the brightness and whiteness of heat treated polycarbonate.

Although the stabilizers of this invention may be used in any desired stabilizing concentration, quantities from about 0.002 percent to about .5 percent by weight based on the weight of the polycarbonate are generally sufficient to render any polycarbonate polymer resistant to thermal degradation and preferably, from about .01 percent to about 0.1 percent by weight of the stabilizer is used. It is to be emphasized, however, that greater quantities of the stabilizer of this invention may be employed and that the upper limit of the concentration range to be used is circumscribed only by economics.

The triazoles of this invention may be mixed with the polycarbonate to be stabilized by any suitable means. A convenient method for adding the triazole is to spray or blend a solution thereof onto granules of the polymer by tumbling followed by extrusion or some other suitable homogenizing step to incorporate the triazole intimately into the polymer composition. The triazoles may also be introduced during the preparation of the polymer as long as they contain no groups which are reactive with any of the components of the reaction mixture; for example, the triazoles can be added to polycarbonates produced by an esterification process while the esterification is being effected. When a polycarbonate is produced by the phosgenation of a dihydroxy compound, a more or less viscous solution is usually formed which, after being washed free of electrolytes, can be mixed with the triazoles of this invention or a solution thereof to obtain an essentially homogeneous dispersion. It is sometimes advantageous to add the triazoles to the polymer by passing already shaped articles such as bristles spun from the polymer through a bath containing the dissolved triazole, in which case a thin triazole film is deposited on the bristles upon evaporation of the solvent. Further, the stabilizers of this invention may be thoroughly distributed in a polycarbonate by simply mixing the materials together by any of the variety of methods normally employed for the incorporation of plasticizers or fillers into thermoplastic polymers including, but not limited to mixing rolls, dough mixers, Banbury mixers, extruders and other mixing equipment.

Any suitable polycarbonate may be stabilized in accordance with this invention. For example, the carbonate polymers may be prepared by reacting a dihydric phenol with carbonate precursors such as phosgene, a haloformate or a carbonate ester. Some suitable reactants and processes for the preparation of polycarbonates are set forth, for example, in Canadian Patents Nos. 578,585; 578,795; and 594,805, and United States Patents Nos. 3,028,365; 2,970,131; 3,248,414; 2,991,273; 2,999,835; 3,014,891 and the like, as well as in Chemistry and Physics of Polycarbonates by Hermann Schnell and Polycarbonates by William F. Christopher and Daniel W. Fox.

Generally, all polycarbonate plastics are subject to thermal discoloration regardless of the compounds from which they are formed or the process used in forming them, and all polycarbonate resins can be treated according to the process of this invention, particularly all high-molecular weight substantially linear thermoplastic polycarbonates. As indicated hereinbefore, the polycarbonate plastic can be produced from a dihydroxy diarylalkane and phosgene or a diester of carbonic acid such as, for example, by the process disclosed by Schnell et al. in Canadian Patent No. 578,585. Another suitable method for preparing the polycarbonate plastic to be stabilized in accordance with this invention is described in United States Patent No. 3,271,367 which discusses dihydroxydiarylsulphones. Other polycarbonates which can be stabilized against discoloration in accordance with this invention are disclosed in United States Patents Nos. 2,999,846 and 3,062,781. Since the foregoing Canadian and United States patents are incorporated herein by reference, a detailed description of methods for making polycarbonates need not be set forth herein. Suffice it is to say that these and all polycarbonates may be treated according to the process of this invention, particularly those which are of the greatest commercial importance and which have weight average molecular weights of at least about 5,000 and most preferably between about 25,000 and 150,000. In all cases, any amount of the triazoles of this invention will stabilize the polymer against discoloration and will even reduce and in some cases do away with all of the discoloration which usually takes place in polycarbonate polymers after they are formed.

Some specific stabilizers which may be employed in accordance with this invention include, for example, any of those which come within the scope of the formulae set forth herein and listed in United States Patent No. 2,784,184, the disclosure of which is incorporated herein by reference. Further, the 2-(stilbyl-4″)-(4,5-arylo)-1,2,3-triazole stabilizers of this invention may be prepared by any suitable method, especially as outlined in United States Patent No. 2,784,184. Particularly preferred triazole stabilizers and mixtures thereof to be used in the practice of this invention are, for example, the following derivatives of 2-(stilbyl-4″)-(naphtho - 1′,2′:4,5)1,2,3 - triazole, 2″ sulphonic acid:phenylester, b-naphthol ester, 4-phenyl phenol ester, t-amyl phenol ester, neopentyl phosphito ester, n-octyl amide, di-n-octyl amide, cyclohexyl amide, dicyclohexyl amide, n-octadecyl amide, dodecyl amide and the like as well as the corresponding derivatives of 2-(stilbyl-4″)-(naphtho-1′,2′:4.5)-1,2,3-triazole, 2″-6′-disulphonic acid such as the di-a-naphthol ester, diphenyl ester, di-n-octyl phenol ester, dineopentyl phosphito ester, di-n-octyl amide, dicyclohexyl amide, bis-dibutyl amide, bis-dicyclohexyl amide and the like and mixtures thereof.

The polycarbonates of this invention may also contain any effective amount of any suitable additive including other types of stabilizers, antioxidants, dyes, pigments, fillers, $TiO_2$ and the like. For example, some suitable antioxidants which may be used include those listed in the Encyclopedia of Polymer Science and Technology, volume 2, pages 176 to 177, 185, 187 and 190 to 194; other stabilizers which may be used include any of the 5,5-dimethyl-1,3,2-dioxyphosphorinanes and the like; some suitable pigments include white opaque pigments such as lead, zinc, titanium and antimony oxide pigments, red, maroon and brown inorganic pigments composed of the various oxides of iron; cadmium yellows, cadmium reds and cadmium maroons, such as cadmium sulfoselenides, cadmium sulfides, and the like, green pigments such as chrome greens, chromium oxides and the hydrated chromium oxides; blue pigments such as iron blues and ultramarine blues; carbon blacks, iron oxide blacks and the like. Particular examples of suitable pigments include Pigment Blue 15 (C.I. 74160), Diluted Black-PDS 161 B–192 (Kohnstamm), Solvent Violet 13 (C.I. 60725), Yellow 37 (C.I. 77199), Cadmium Red (C.I. 77196), Croton Fast Green Toner 4D–3600 (Harshaw Chemical Company), Amaplast Yellow GHS (Drakenfeld), PDS 987 Thermax Blue-Black (Kohnstamm), Marine Blue (Drakenfeld), Scarlet Red 10177 (Drakenfeld), Scarlet Red 10051 (Drakenfeld), phthalocyanine pigments such as, for example, copper phthalocyanine (Monastral Fast Blue B or Heilogen Blue BA), chlorinated copper phthalocyanine (Monastral Fast Green G or Heilogen Green GA), sulfonated copper phthalocyanine, metal free phthalocyanine (Monastral Fast Blue G) and phthalocyanine derivatives in which one or more of the external hydrogen atoms are replaced by other groups such as halogen, alkyl, aryl, amino, nitro, substituted amino, sulfo, carboxy, alkoxy, aryloxy, thiocyane and the like. The stabilizers of this invention are particularly suitable for stabilizing filled and/or pigmented polycarbonates since they are efficacious notwithstanding the presence of the pigment in the composition while other stabilizers are known to be rendered less effective or non-effective in the presence of a pigment or filler.

The stabilized polycarbonates of this invention may be used in any application for which such materials are eminently suitable. For example, they may be used for preparing gaskets, hard hats, skis, windows, tubing and other materials such as films, foils, coatings, fibers and the like. Because of their improved properties and their ability to resist thermal degradation, the polycarbonates of this invention are eminently suitable for such applications as well as any others in which the polymer will be subjected to heat.

The invention is further illustrated but not limited by the following examples in which all parts and percentages are by weight unless otherwise specified.

EXAMPLE 1

Preparation of the polycarbonate

About 454 parts of 4,4'-dihydroxydiphenyl-2,2-propane and about 9.5 parts of p-tertiary-butylphenol are suspended in about 1.5 liters of water. In a three-neck flask equipped with agitation and a gas addition tube, oxygen is removed from the mixture by blowing nitrogen through it while agitating for about 15 minutes. Then about 355 parts of 45 percent sodium hydroxide and about 1,000 parts of methylene chloride are added. The mixture is cooled to about 25° C. While maintaining this temperature by cooling, about 237 parts of phosgene are added uniformly over about a 120 minute period. An additional about 75 parts each of a 45 percent sodium hydroxide solution are added after about 15 to 30 minutes respectively after the phosgene addition has begun. To the resulting solution, about 1.6 parts of triethylamine are added and the mixture is agitated for an additional 15 minutes. A highly viscous solution is formed, the viscosity of which is adjusted by the addition of methylene chloride and the aqueous phase is separated. The organic phase is washed with water until free of salt and alkali. The polycarbonate is recovered from the washed solution and dried. The polycarbonate has a relative viscosity of 1.32 measured from a 0.5 percent solution of methylene chloride at 20° C., equivalent to approximately a 34,000 molecular weight product.

The polycarbonate resin is extruded into pellets which are blended with the stabilizer of this invention by tumbling a stabilizing amount of the stabilizer with the resin in a stainless steel container in a Mod 730 D U.S. Stoneware drum tumbler. Where a solid additive such as a pigment, a dye or other stabilizers are to be a component of the composition, they are then added to the resin/stabilizer mixture and the resulting mixture is blended in a second tumbling operation. The final resin-additive mixture is homogenized by melting and mixing it in a 1½" single screw extruder equipped with a screen pack and a strand die. The extruded strands are cooled and chopped into pellets suitable for molding into test specimens or for testing in their unmolded state.

EXAMPLE 2

A polycarbonate prepared as described in Example 1 but having a relative viscosity of about 1.32 and a molecular weight of about 34,000 is blended as described in Example 1 with 2-(stilbyl-4")-(naphtho-1',2':4.5)-1,2,3 triazole-2" sulphonic acid phenyl ester in the quantities set forth in Table 1 and molded into test specimens. The specimens are tested for stability under heat and heat aging conditions with the results set forth in Tables 1 and 2. The samples show that the unique action of the stilbyl triazole virtually eliminates any color changes in the polycarbonate polymer upon exposure to dry heat at 130° C. after a part has been fabricated. This color stabilization due to the absence of thermal degradation is obtained without any attendant loss in toughness on exposure to aging at 100° C. and without loss of melt color stability. This indicates that color stability is attained without the reinforcement of reemitted light due to the fluorescent nature of the stabilizer. When the fluorescent nature of the stabilizer is also taken into account as when aged samples are visually evaluated, the effect of the above stilbyl triazole is even more pronounced in preserving the brightness and whiteness of heat treated polycarbonate.

TABLE I

| Amount of stabilizer | After extrusion | | | | After 242 hours at 123° C. | | |
|---|---|---|---|---|---|---|---|
| | $T_{420}$ mu, percent | $T_{460}$ mu, percent | YI | $Y_{CIE}$, percent | $T_{420}$ mu, percent | $T_{460}$ mu, percent | YI |
| No additive | 79.0 | 81.9 | 5.9 | 85.6 | 77.7 | 81.0 | 6.6 |
| .025 pph | 79.0 | 83.5 | 6.1 | 85.6 | 79.0 | 84.0 | 6.5 |

TABLE II

| Amount of stabilizer | Heat relax [1] 1st low, hours | Dry heat 130° C. [2] | | | Melt [3] stability APHA |
|---|---|---|---|---|---|
| | | $T_{420}$ mu, 0 day percent | $T_{460}$ mu 0 day percent | Y.F. 14 days | |
| No additive | 64 | 77.8 | 82.3 | 3.5 | 350 |
| 0.05 pph | 128 | 65 | 81.5 | 0 | 400 |

NOTE:
$T_{420}$mu = Transmission or reflectance at 420 mu.
$T_{460}$mu = Transmission or reflectance at 460 mu.
YI = Yellowness index, ASTM 1925.
$Y_{CIE}$ = Tristimulus Y value, ASTM D 307-44, a measure of total brightness.

YF = Yellow factor, NEMA, SPI, IES designation = $\frac{\Delta T_{420} mu - \Delta T_{680} mu}{T_{560} mu}$ where $\Delta T$ = change in transmission due to treatment.

[1] Measure of impact strength stability in time of exposure at 100° C. for a ⅛ x ½ x 5" bar to lose ductibility.
[2] Measure of color stability.
[3] Determined by conditioning a sample 23½ hours at 309° C. in air and nitrogen and determining color by APHA standards.

EXAMPLE 3

The procedure and polycarbonate described in Example 2 is employed except that 6-methyl - 5 - methoxy-2 (stilbyl-4')benzotriazole-2-sulfonic acid phenyl ester.

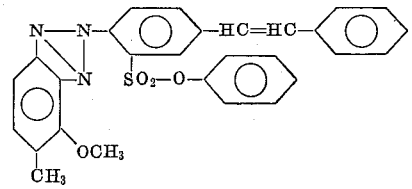

prepared as described in Example 8 of U.S. Pat. 2,784,184 is used in the quantities set forth in Table III molded test specimens are prepared and tested for stability with the results set forth in Table II.

TABLE III

| Stabilizer added | Dry heat 130° C. | | | Melt stability APHA | Heat relax, 1st low, hours |
|---|---|---|---|---|---|
| | $T_{420}$mu, 0 day percent | $T_{460}$ mu, 0 day percent | Y.F. 14 days | | |
| None | 77.0 | 82 | 1.75 | 500 | 72 |
| .05 pph | 76.0 | 81.0 | 0.36 | 350 | 72 |

EXAMPLE 4

To a white pigmented opaque polycarbonate prepared as described in Example 1 but containing about 1.94% rutile $TiO_2$ as the whitening agent and about 0.006% of blue colorant which masks any inherent yellowness of the polycarbonate is added about 0.2 pph. (parts per hundred) of the stilbyl triazole described in Example 2 by dry-blending followed by extrusion. Molded test specimens prepared from the extruded composition were subjected to heat in air at about 130° C. for about 14 days. The test results are set forth in Table IV.

TABLE IV

| Amount of stabilizer | 0 day | | | 14 day | | | |
|---|---|---|---|---|---|---|---|
| | $T_{420}$ mu percent | $Y_{CIE}$ | Y.I. | $T_{420}$ mu, | $Y_{CIE}$ | Y.I. | $\Delta(YI)$ |
| None | 74.5 | 77.7 | −3.0 | 73.0 | 77.6 | −1.4 | 2.6 |
| 0.2 pph | 75.5 | 79.0 | −3.5 | 74.0 | 78.7 | −4.3 | −0.8 |

The negative Yellowness Index values are due to the slight bluish cast imparted to the polymer by the blue colorant used in the formulation as described above. The optical values of the test specimens in this example as in the other examples were measured in an environment devoid of ultraviolet light so that the reported values are not influenced by any possible fluorecence of the stabilizer. Clearly, the formulation containing the stabilizer of this invention did not yellow as a result of the heat treatment while the control sample yellowed significantly.

It is to be understood that any of the components and conditions mentioned as suitable herein can be substituted for its counterpart in the foregoing examples and that although the invention has been described in considerable detail in the foregoing, such detail is solely for the purpose of illustration.

What is claimed is:

1. A polycarbonate stabilized against thermal degradation which comprises a polycarbonate composition containing a stabilizing amount of a 2 - (stilbyl-4'') - (4,5-arylo)-1,2,3-triazole.

2. The polycarbonate of claim 1 wherein the 2-(stilbyl-4'')-(4,5-arylo)-1,2,3-triazole has the formula

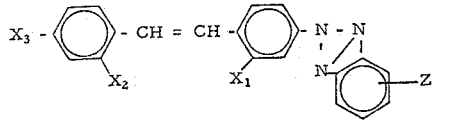

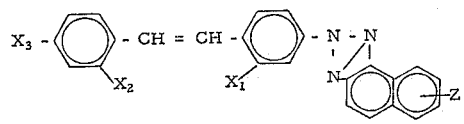

wherein Z is hydrogen or —SO₃H and $X_1$, $X_2$ and $X_3$ are hydrogen atoms, sulfonyl or sulfonic acid radicals with the proviso that at least one of the $X_1$, $X_2$ and $X_3$ radicals is a sulfonyl or sulfonic acid radical.

3. The polycarbonate of claim 1 wherein the 2-(stilbyl-4'')-(4,5-arylo)-1,2,3-triazole has the formula

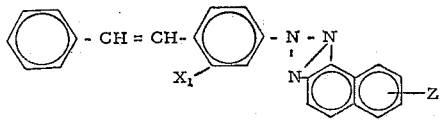

wherein Z is hydrogen or —SO₃H and $X_1$ is —CN or a sulfonyl or sulfonic acid radical.

4. The polycarbonate of claim 1 wherein the amount of the 2-(stilbyl-4'')-(4,5-arylo)-1,2,3-triazole is from about 0.002 to about 0.5 percent by weight of the polycarbonate.

5. The polycarbonate of claim 1 wherein the 2-(stilbyl-4'')-(4,5-arylo)-1,2,3-triazole is

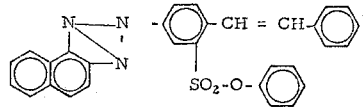

6. The polycarbonate of claim 1 wherein the polycarbonate composition contains the repeating units

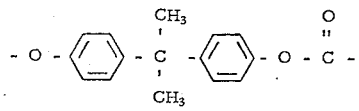

7. The polycarbonate of claim 1 wherein the 2-(stilbyl-4'')-(4,5-arylo)-1,2,3-triazole is

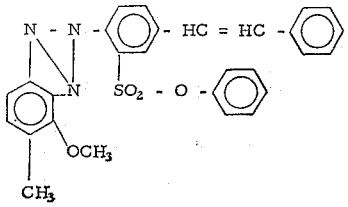

References Cited

UNITED STATES PATENTS

| 2,784,184 | 3/1957 | Sweidler et al. | 260—240 |
| 3,205,202 | 9/1965 | Schnegg et al. | 260—78 |
| 3,218,332 | 11/1965 | Heller et al. | 260—308 |
| 3,305,520 | 2/1967 | Fritz et al. | 260—45.7 |
| 3,337,356 | 8/1967 | Carboni | 106—176 |
| 3,367,958 | 2/1968 | Kirkendall | 260—45.8 |

DONALD E. CZAJA, Primary Examiner

R. A. WHITE, Assistant Examiner

U.S. Cl. X.R.

260—37